(12) United States Patent
Mikata

(10) Patent No.: US 7,968,816 B2
(45) Date of Patent: Jun. 28, 2011

(54) WELD FAIRING APPARATUS AND WELDING METHOD USING THE SAME

(75) Inventor: Hironari Mikata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 461 days.

(21) Appl. No.: 11/792,666

(22) PCT Filed: Dec. 7, 2005

(86) PCT No.: PCT/JP2005/022908
§ 371 (c)(1),
(2), (4) Date: Jun. 8, 2007

(87) PCT Pub. No.: WO2006/062241
PCT Pub. Date: Jun. 15, 2006

(65) Prior Publication Data
US 2008/0105667 A1    May 8, 2008

(30) Foreign Application Priority Data

Dec. 10, 2004  (JP) ................................. 2004-358604

(51) Int. Cl.
*B23K 11/04* (2006.01)
(52) U.S. Cl. ........... 219/101; 219/104; 219/105; 219/83
(58) Field of Classification Search ................. 219/128, 219/121.11, 81–83; 228/155
See application file for complete search history.

(56) References Cited

U.S. PATENT DOCUMENTS

| | | | | |
|---|---|---|---|---|
| 3,818,172 | A | * | 6/1974 | Larsson et al. .................. 219/82 |
| 4,626,651 | A | * | 12/1986 | Taniguchi et al. ....... 219/121.63 |
| 2005/0242071 | A1 | * | 11/2005 | Gobez et al. ............. 219/121.64 |

FOREIGN PATENT DOCUMENTS

| | | |
|---|---|---|
| DE | 28 17 021 | 4/1979 |
| JP | 62-101382 | 5/1987 |
| JP | 2-43590 | 9/1990 |
| JP | 09-206969 | 8/1997 |
| JP | 09-225674 | 9/1997 |
| JP | 9-225674 | 9/1997 |
| JP | 2004-298964 | 10/2004 |
| JP | 2004-330300 | 11/2004 |
| JP | 2006-159240 | 6/2006 |
| JP | 2006-159241 | 6/2006 |

OTHER PUBLICATIONS

Machine Translation of JP 2004-298964.*
Extended European Search Report for EP Appl. No. 05816747.9, dated Oct. 13, 2009.

* cited by examiner

*Primary Examiner* — Mark H Paschall
*Assistant Examiner* — Brian Jennison
(74) *Attorney, Agent, or Firm* — Finnegan, Henderson, Farabow, Garrett & Dunner, LLP

(57) ABSTRACT

A weld fairing apparatus and a welding method using the apparatus effectively prevent a weld metal zone from forming a humping bead. The welding method includes: butting first and second object pieces together; heating the butted first and second object pieces using a heating device, thus forming a weld metal zone; and placing a fairing device such that the fairing device comes into contact with the weld metal zone and fairs the weld metal zone.

21 Claims, 12 Drawing Sheets

WELD FAIRING APPARATUS AND WELDING METHOD USING THE SAME

TECHNICAL FIELD

The present invention relates to a weld fairing apparatus and a welding method using the apparatus.

BACKGROUND ART

Hereinbelow, as an example of the related art of the present invention, a welding technique for producing welded products using high energy density beams such as laser beams will be described. The high energy density beams have high energy input per unit area of beam, thus effectively increasing the weld strength of weld metal zones in welded products. In recent years, as shown in FIG. 16 and FIG. 17, a laser beam is preferably used for welding a plurality of pieces of sheet material 1X and 2X together to produce a welded product.

Japanese Patent Publication No. Hei. 2-43590 (first cited patent document) discloses a butt seam welding technique, in which ends of thin steel sheets are butted and welded together using a laser beam. In the butt seam welding technique, welding is executed under the condition that the laser beam is transmitted through an optical fiber, with the spot diameter of the beam set to two or more times the thickness of each of the steel sheets, or ten or more times the gap between the butted ends of the steel sheets, and the energy density of the beam set lower than a level capable of generating plasma.

In addition, Japanese Patent Laid-open Publication No. Sho. 62-101382 (second cited patent document) discloses a method of welding the flanges of a pulley to each other, in which an electrode is placed to come into contact with the outer circumferential surfaces of the flanges (the outer diameter end surfaces of the flanges) from the outside, ring-shaped compression discs, which are made of a nonconductive and heat-resistant ceramic material, are placed outside the side surfaces of the respective flanges and compress the flanges in the thickness direction of the flanges, and, thereafter, a welding current flows to the electrode, thus generating Joule heat to weld the flanges together.

According to the above-mentioned related art, as shown in FIG. 17, a weld metal zone 5X is formed between the butted surfaces of the pieces of sheet material 1X and 2X. Further, it is necessary to increase the weld strength and the weld reliability of the weld metal zone 5X. However, when the heat input by a laser beam is increased in order to increase the depth of weld penetration in the weld metal zone 5X, humping is generated in the weld metal zone 5X, as shown in FIG. 18, and thus a humping bead may be formed in the weld metal zone 5X. The technical term "humping bead" means a bead that may be formed in a weld metal zone when molten weld metal in the weld metal zone is humped, thus causing uneven thickness of the weld metal zone in a welded product.

Described in brief, the first and second cited patent documents are problematic in that an increase in the heat input by the laser beam undesirably forms a humping bead in the weld metal zone.

DISCLOSURE OF THE INVENTION

Accordingly, the present invention has been made keeping in mind the above problems occurring in the related art, and an object of the present invention is to provide a weld fairing apparatus and a welding method using the apparatus, which effectively prevent a humping bead from being formed in a weld metal zone.

In order to achieve the above object, according to one aspect of the present invention, there is provided a welding method, in which a first object piece and a second object piece are butted together and are heated by a heating device, thus forming a weld metal zone, the method comprising: placing a fairing device such that the fairing device is in contact with the weld metal zone, thus fairing the weld metal zone. Because the weld metal zone is faired by the fairing device, the formation of a humping bead in the weld metal zone can be prevented. Thus, although the heat input by a laser beam is lower or higher than a reference level, the formation of the humping bead in the weld metal zone can be prevented. Because the formation of the humping bead in the weld metal zone can be prevented even when the heat input by the laser beam is higher than the reference level, the heat input can be increased so as to increase the depth of weld penetration in the weld metal zone and improve the weld reliability of the weld metal zone.

According to another aspect of the present invention, there is provided a weld fairing apparatus, which is used for fairing a weld metal zone that is formed by heating butted first and second object pieces using a heating device, the weld fairing apparatus comprising a fairing device having a contact surface for coming into contact with the weld metal zone and fairing the weld metal zone. Because the weld metal zone can be faired by the fairing device, the formation of the humping bead in the weld metal zone can be prevented, so that, although heat input by a laser beam is lower or higher than a reference level, it is possible to prevent the formation of the humping bead in the weld metal zone. As described above, the humping bead is prevented from being formed in the weld metal zone even when high heat is input, so it is possible to increase the depth of weld penetration in the weld metal zone and improve the weld reliability of the weld metal zone by increasing the heat input by the laser beam.

Advantages of the Invention

According to the weld fairing apparatus and the welding method using the apparatus according to the present invention, the weld metal zone can be faired by the fairing device, so that the humping bead can be prevented from being formed in the weld metal zone. Thus, even when a step is defined between a first object piece and a second object piece, or the heating conditions for welding are varied, desired weld metal zones can be formed, thus increasing the freedom of welding conditions.

BRIEF DESCRIPTION OF THE DRAWINGS

The above and other objects and features of the present invention will become apparent from the following description of a preferred embodiment, given in conjunction with the accompanying drawings, in which.

BEST MODE FOR CARRYING OUT THE INVENTION

Figure 1:
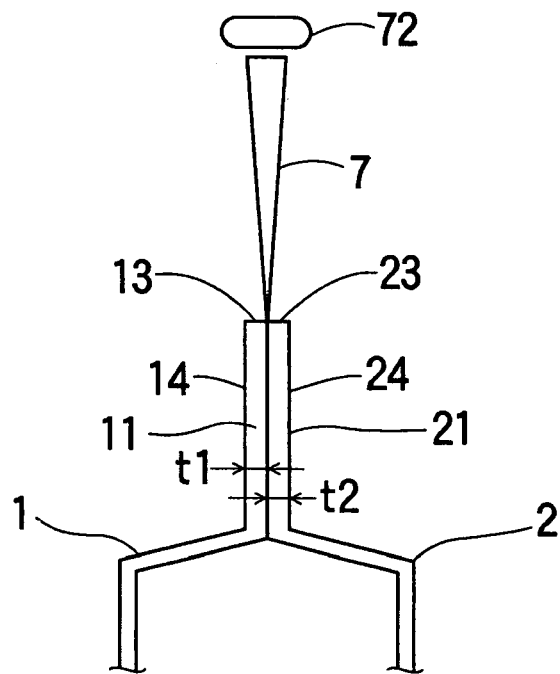
FIG. 1 is a front view schematically illustrating a state in which the first edge of a first piece of sheet material and the second edge of a second piece of sheet material overlap each other and a laser beam is applied to the junction between the overlapping edges of the pieces of sheet material, according to a first embodiment of the present invention.
Figure 2:
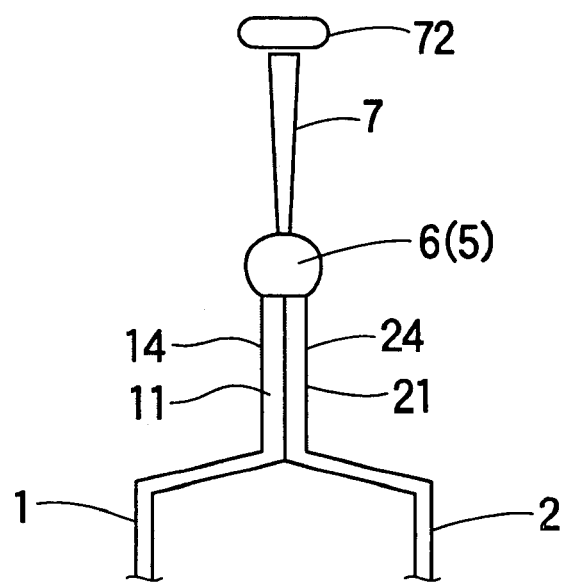
FIG. 2 is a front view schematically illustrating the state in which a laser beam is applied to the junction of the overlapping first and second edges of the pieces of sheet material, thus forming a molten weld metal or a weld bead on the junction.

Various embodiments of the present invention will now be described in detail with reference to the accompanying drawings.

In the present invention, a heating device may be selected from conventional means, such as high energy density beams, electric arcs, electric currents and gases. Examples of the high energy density beams are laser beams or electron beams. Examples of the laser are a YAG laser, a $CO_2$ laser, a ruby laser, an Ar laser and a glass laser. The first object piece and the second object piece are preferably made of metal, which can be melted and welded together by heat, and which may be selected from ferrous metals or nonferrous metals. The ferrous metals may be mild steels, hard steels, or alloy steels. Examples of the alloy steels are stainless steels. Examples of the stainless steels may be ferrite steels, austenite steels, and martensite steels. When the welded product is a ferrous product, the carbon content in the product is 1.0% or less, 0.8% or less, 0.5% or less, or 0.3% or less by mass of the product, and further, 0.1% or less or 0.05% or less by mass of the product. When the welded product is the ferrous product, it is preferred that the carbon content in the product be limited, to thus limit over-tempering.

In the present invention, each of the first object piece and the second object piece is preferably configured as sheet material. Thus, the welded product may be configured as a structure, fabricated by welding a plurality of pieces of metal-based sheet material together. Described in detail, to produce a welded product in the present invention, it is preferred that the ends of a plurality of pieces of sheet material be butted together and that the butted ends of the pieces of sheet material be heated to form a weld metal zone, thus welding the plurality of pieces of sheet material to each other.

The fairing device is preferably placed behind part of the butted ends of the pieces of sheet material, heated by the heating device, in a welding direction. In the above state, the distance between the part of the butted ends of the pieces of sheet material, heated by the heating device, and the fairing device may be a variable distance. When the distance is a variable distance, the extent of fairing of the weld metal zone can be controlled. When the distance is too long and thus the weld metal zone becomes too cold, the extent of fairing of the weld metal zone will be limited. Further, when the distance is too short and thus the molten weld metal in the weld metal zone is too abundant, the molten weld metal may flow out. Thus, it is preferred that the distance between the part of the butted ends of the pieces of sheet material, heated by the heating device, and the fairing device be determined in consideration of the circumstances.

The fairing device may be formed as a compression unit having a contact surface coming into contact with the weld metal zone. For example, the compression unit may be formed as a rotary unit. When the compression unit is configured as a rotary unit, the rotary unit is advantageous in that the weld metal zone can be continuously faired by the rotary unit. The rotary unit may comprise a roller or an endless unit, such as a caterpillar or a belt. The rotary unit may be configured as a driven type or a drive type unit. For example, the fairing device may comprise a first compression unit and a second compression unit, which are contactable with the weld metal zone and compress the weld metal zone. At least one of the first compression unit and the second compression unit may be configured as a roller, having a contact surface coming into contact with the weld metal zone.

Further, the distance between the first compression unit and the second compression unit in the thickness direction of the weld metal zone may vary. In the above state, it is possible to properly respond to a variation in the thickness of the weld metal zone. Further, the variation in the distance between the first and second compression units in the thickness direction of the weld metal zone can control the forging effect of the weld metal zone.

Further, the fairing device may comprise an endless assembly, having contact surfaces that come into contact with the weld metal zone, and a support for supporting the endless assembly. The endless assembly is rotated with the rotary unit of the compression unit while the contact surfaces of the endless assembly come into contact with the weld metal zone. The endless assembly may be configured as a belt or a chain. The endless assembly may be configured as a driven type or a drive type unit.

According to the present invention, although high heat is input, the fairing device prevents the formation of a humping bead in the weld metal zone, thus realizing a high welding speed and increasing the depth of weld penetration in the weld metal zone by increasing the heat input by the laser beam. In the above case, when the first object piece and the second object piece are pieces of sheet material, the depth of weld penetration into the weld metal zone is set to HA millimeters and the thickness of the first sheet material is set to t1 millimeters, HA/t1=2 to 20, so that the ratio of the depth of weld penetration of the weld metal zone to the thickness of the first sheet material can be preferably determined to be a large ratio. The ratio of HA to t1 (HA/t1) can be determined according to the kind of a welded product. For example, the ratio of HA to t1 is preferably included within a range of 2.5 to 20, a range of 2 to 19, a range of 2 to 18, a range of 2 to 15, or a range of 2 to 10. Further, the lower limit value of the ratio of HA to t1 is set to, for example, 2.2, 2.5, 3, 3.5, 4 or 5. Further, the upper limit value of the ratio of HA to t1, which is set in consideration of the lower limit value, is set to, for example, 20, 15, 10 or 8.

When the width of the weld metal zone in the thickness direction is denoted by W, the relationship between W and t1 may be expressed as $W \geq t1$, wherein the width W of the weld metal zone in the thickness direction is expressed as $W=t1 \times 2$. Thus, the width W of the weld metal zone in the thickness direction may be expressed as $W=(t1 \times 2) \times \alpha$, wherein $\alpha=0.85$ to 1.15 or 0.95 to 1.05.

After the fairing of the weld metal zone, the weld metal zone may have an exposed surface, which is exposed in the direction of the depth of weld penetration. Particularly, after the fairing of the weld metal zone, the weld metal zone may have two exposed surfaces, which are exposed outwards in opposite directions. In other words, the weld metal zone after the fairing may include a first exposed surface, which is exposed outwards and faces one thickness direction of the first sheet material, and a second exposed surface, which is exposed outwards and faces the opposite thickness direction of the second sheet material. In the above case, the first exposed surface and the second exposed surface of the faired weld metal zone are exposed outwards, and thus it is possible to observe the depth of weld penetration in the weld metal zone from the first exposed surface and the second exposed surface with the naked eyes, or using an image pickup device, thus desirably increasing the strength and reliability of the weld metal zone.

In a preferred embodiment of the present invention, when the first object piece and the second object piece are pieces of sheet material, the thickness of the first sheet material is set to t1, and the thickness of the second sheet material is set to t2, the first exposed surface of the weld metal zone may be defined within a range of t1/5 millimeters inside or outside a line extending the surface of an edge of the first sheet material in the thickness direction of the weld metal zone, and the second exposed surface of the weld metal zone may be defined within a range of t1/5 millimeters inside or outside a line extending the surface of an edge of the second sheet material in the thickness direction of the weld metal zone.

Thus, in a preferred embodiment of the present invention, the first exposed surface of the weld metal zone may be defined along the line extending the surface of a first edge of the first sheet material, while the second exposed surface of the weld metal zone may be defined along the line extending the surface of a second edge of the second sheet material. Further, the first and second exposed surfaces of the weld metal zone may have respective traces, formed by the fairing device. When the traces are concave or convex traces, it is possible to increase the strength of adherence of paint after painting.

Further, the weld metal zone may comprise an exposed surface, which is exposed outwards and face outwards from one of the first and second pieces of sheet material, wherein the remaining one (non-welded sheet material) of the first and second pieces of sheet material is exposed at the side opposite the exposed surface of the weld bead. The above-mentioned state may be easily generated when the heating position of a heat source, such as a laser beam, deviates from a desired heating position, or when the first sheet material and the second sheet material have different thicknesses.

First Embodiment

Hereinbelow, a first embodiment of the present invention will be described in detail with reference to FIG. 1 through FIG. 6. The drawings are schematic views, in which the construction is not shown in detail. The first embodiment is adapted to welding the edges of object pieces together. As shown in FIG. 1, a first piece of sheet material 1, made of metal, is used as the first object piece, and a second piece of sheet material 2, made of metal, is used as the second object piece. To weld the edges of the pieces of sheet material together, a first edge 11 of the first piece of sheet material 1 overlaps a second edge 21 of the second piece of sheet material 2. Each of the first piece of sheet material 1 and the second piece of sheet material 2 includes a ferrous metal (for example, having a carbon content of 0.3% or less by mass, and more preferably, 0.1% or less by mass). The thickness of the first edge 11 of the first piece of sheet material 1 is denoted by t1, while the thickness of the second edge 21 of the second piece of sheet material 2 is denoted by t2, wherein t1=t2, t1≈t2, t1<t2 or t1>t2.

As shown in FIG. 1, before a laser beam 7 is applied to the overlapping edges 11 and 21, the first end surface 13 of the first edge 11 of the first piece of sheet material 1 and the second end surface 23 of the second edge 21 of the second piece of sheet material 2 are set flush with each other, thus forming a flat surface. Therefore, the laser beam 7 can be evenly applied to the overlapping edges 11 and 21 and the weld strength of the weld bead 5 is increased. However, in the present invention, a step may be defined between the first end surface 13 and the second end surface 23.

Further, as shown in the schematic view of FIG. 1, the YAG laser beam 7, which is a high energy density beam used as the heating device, is applied from a laser source 72 to the end surfaces 13 and 23 of the first edge 11 and the second edge 21, thus melting the end surfaces 13 and 23. Therefore, a molten weld metal 6 is created and solidified to form a weld bead 5 as the weld metal zone. Here, laser beam welding is executed with high heat input per unit area of beam, thus resulting in quick heating, and is cooled quickly, thus resulting in quick cooling. Further, while welding, the laser beam 7 is moved relative to the first edge 11 and the second edge 21 in the direction of the arrow X1 (welding direction, see FIG. 4). The welding direction means the direction in which the welding is conducted. In the present invention, the laser beam 7 may be moved while the first edge 11 and the second edge 21 are fixed. Alternatively, the first edge 11 and the second edge 21 may be moved while the laser beam 7 is fixed.

Figure 3:
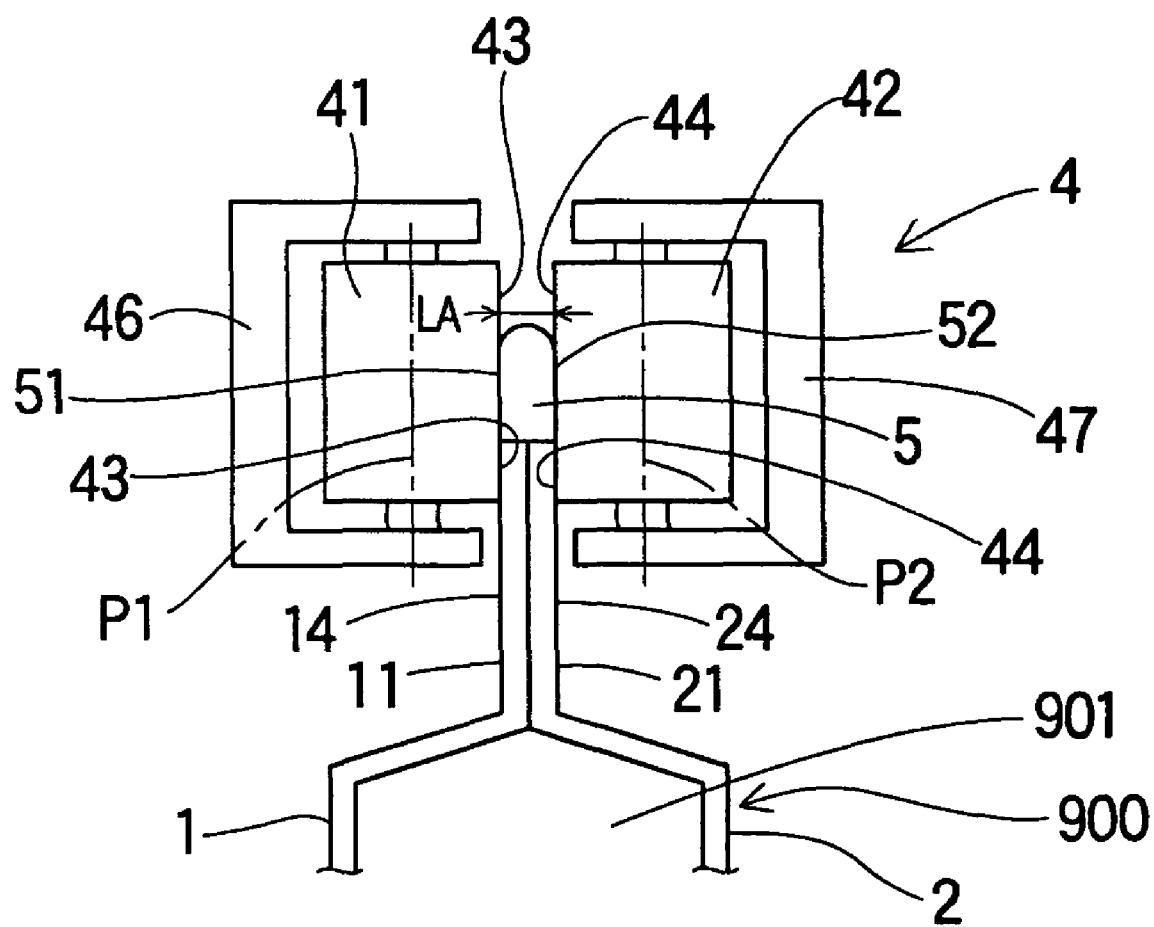
FIG. 3 is a front view schematically illustrating a state in which the weld bead, formed by the laser beam, is faired by a fairing device.
Figure 4:
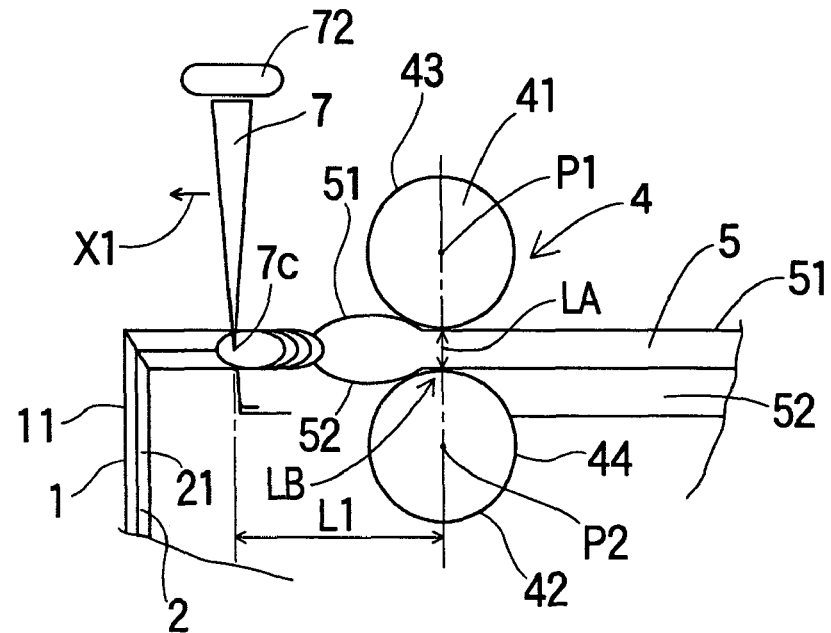
FIG. 4 is a side view schematically illustrating the state in which the weld bead is faired at a position behind a heat input location of the laser beam during application of the laser beam to the junction of the overlapping edges of the pieces of sheet material.

As schematically shown in FIG. 4, the fairing device 4 is placed behind a heat input position 7c of the laser beam 7 in the welding direction. In other words, the fairing device 4 is placed at the location on which the laser beam 7 has been applied. The fairing device 4 comprises a first rotary unit 41 (first compression unit), having a first flat roller surface 43 (first contact surface), and a second rotary unit 42 (second compression unit), having a second flat roller surface 44 (second contact surface). As shown in the schematic view of FIG. 3, the first rotary unit 41 is rotatably held in a first support 46, while the second rotary unit 42 is rotatably held in a second support 47. In the embodiment, the first rotary unit 41 and the second rotary unit 42 are configured as driven type units, which are not connected to a drive motor, thus being rotatably idle. However, as desired, the first rotary unit 41 and the second rotary unit 42 may be configured as drive type units connected to a drive motor.

The first rotary unit 41 and the second rotary unit 42 have the same diameter. The central axis P1 of the first rotary unit 41 is parallel to the central axis P2 of the second rotary unit 42 in a vertical direction. In the present invention, each of the first rotary unit 41 and the second rotary unit 42 may be configured as a structure having a cooling channel therein to cool the rotary unit. However, it should be understood that the first rotary unit 41 and the second rotary unit 42 may be configured as structures that lack cooling channels. Further, the first rotary unit 41 and the second rotary unit 42 may be made of a metal or ceramic material. When the first rotary unit 41 and the second rotary unit 42 are made of metal, the metal rotary units 41 and 42 have high thermal conductivity, so that they can quickly cool the molten weld metal or the weld bead 5 in a short period of time. The metal of the rotary units 41 and 42 may be, for example, ferrous metal, or copper-, titanium- or aluminum-based metal. The ceramic material of the rotary units 41 and 42 may be, for example, alumina, silica, silicon carbide, silicon nitride or zirconium oxide.

According to the first embodiment, the distance L1 (see FIG. 4) between the heat input position 7c of the laser beam 7 and the fairing device 4 is capable of being varied. In the above case, the location of the first support 46 and the second support 47 may be moved relative to the heat input position 7c of the laser beam 7 in the welding direction (the direction of the arrow X1). Here, when the first piece of sheet material 1 and the second piece of sheet material 2 are fixed, the heat input position 7c of the laser beam 7 may be moved relative to the fixed first and second pieces of sheet material 1 and 2. When the heat input position 7c of the laser beam 7 is moved as described above, it is preferred to make the first rotary unit 41 and the second rotary unit 42 follow the heat input position 7c of the laser beam 7.

Further, when the heat input position 7c of the laser beam 7 is fixed, the first piece of sheet material 1 and the second piece of sheet material 2 may be moved relative to the heat input position 7c of the laser beam 7. In the above case, the first rotary unit 41 and the second rotary unit 42 may fixed at their locations. Alternatively, the first and second rotary units 41 and 42 may be movable relative to the heat input position 7c of the laser beam 7, so that the distance L1 can vary.

The distance L1 (see FIG. 4) is equal to the distance between the heat input position 7c of the laser beam 7 and the position LB, whereas the distance LA between the first rotary unit 41 and the second rotary unit 42 is minimized. In the present invention, the distance L1 may be appropriately determined in accordance with the welding conditions. For example, the distance L1 may be set within the range of 0<L1<100 mm or 0<L1<50 mm, and particularly 0<L1<30 mm. In the present invention, it is possible to select the fairing temperature of the weld bead 5 by changing the distance L1 while the weld bead 5 is fairing by the fairing device 4. For example, the weld bead 5 may be faired by the fairing device 4 while the outer surface and the interior of the weld bead 5 become solidified. Alternatively, the weld bead 5 may be faired by the fairing device 4 while the outer surface of the weld bead 5 becomes solidified, but the interior of the weld bead 5 remains in a molten state. As a further alternative, the weld bead 5 may be faired by the fairing device 4 while the outer surface of the weld bead 5 is in a half-solidified state.

Further, according to the first embodiment, the distance LA (see FIG. 4) between the first roller surface 43 of the first rotary unit 41 and the second roller surface 44 of the second rotary unit 42 in the thickness direction of the weld bead 5 varies. Thus, the thickness of the weld bead 5 can be controlled. When the distance LA is controlled as described above, a forging effect of the weld bead 5 can be expected. The forging effect of the weld bead 5 is advantageous in that it preferably increases the strength of the weld bead 5 and reduces the number of pinholes in the weld bead 5.

Figure 5:
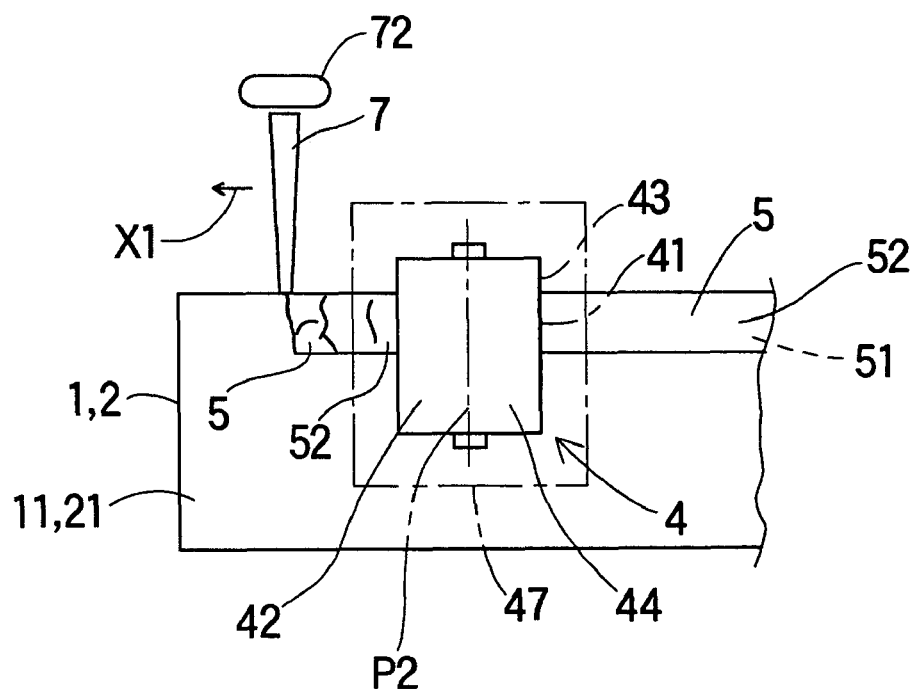
FIG. 5 is a plan view schematically illustrating the state in which the weld bead is faired at the position behind the heat input location of the laser beam during application of the laser beam to the junction of the overlapping edges of the pieces of sheet material.

When the weld bead 5 is formed as described above, the fairing device 4 properly comes into contact with the weld bead 5 and fairs the weld bead 5, as schematically shown in FIG. 3 through FIG. 5. In the above case, as shown in the schematic view of FIG. 3, the first roller surface 43 of the first rotary unit 41 comes into contact with a first exposed surface 51 of the weld bead 5, which is a first side surface of the weld bead 5 in the thickness direction of the weld bead 5. Further, the second roller surface 44 of the second rotary unit 42 comes into contact with a second exposed surface 52 of the weld bead 5, which is a second side surface of the weld bead 5 in the thickness direction of the weld bead 5. As described above, the first and second exposed surfaces 51 and 52 of the weld bead 5 are faired by the fairing device 4, so that the present invention can provide a good weld bead 5 having an excellent appearance. During the fairing of the weld bead 5, as schematically shown in FIG. 3, the first roller surface 43 of the first rotary unit 41 comes into contact with a first surface 14 of the first piece of sheet material 1, while the second roller surface 44 of the second rotary unit 42 comes into contact with a second surface 24 of the second piece of sheet material 2. Thus, the thickness of the weld bead 5 can be limited.

In the first embodiment, although the heat input by the laser beam 7 is lower or higher than a reference level, the weld bead 5 can be efficiently faired by the fairing device 4, thus preventing the formation of a humping bead. As described above, because the formation of the humping bead in a weld metal zone can be prevented even when the heat input by the laser beam 7 is higher than a reference level, the heat input can be increased to increase the depth of weld penetration in the weld metal zone, increase the strength of the weld bead 5 and improve the weld reliability of the weld bead 5.

Figure 6:
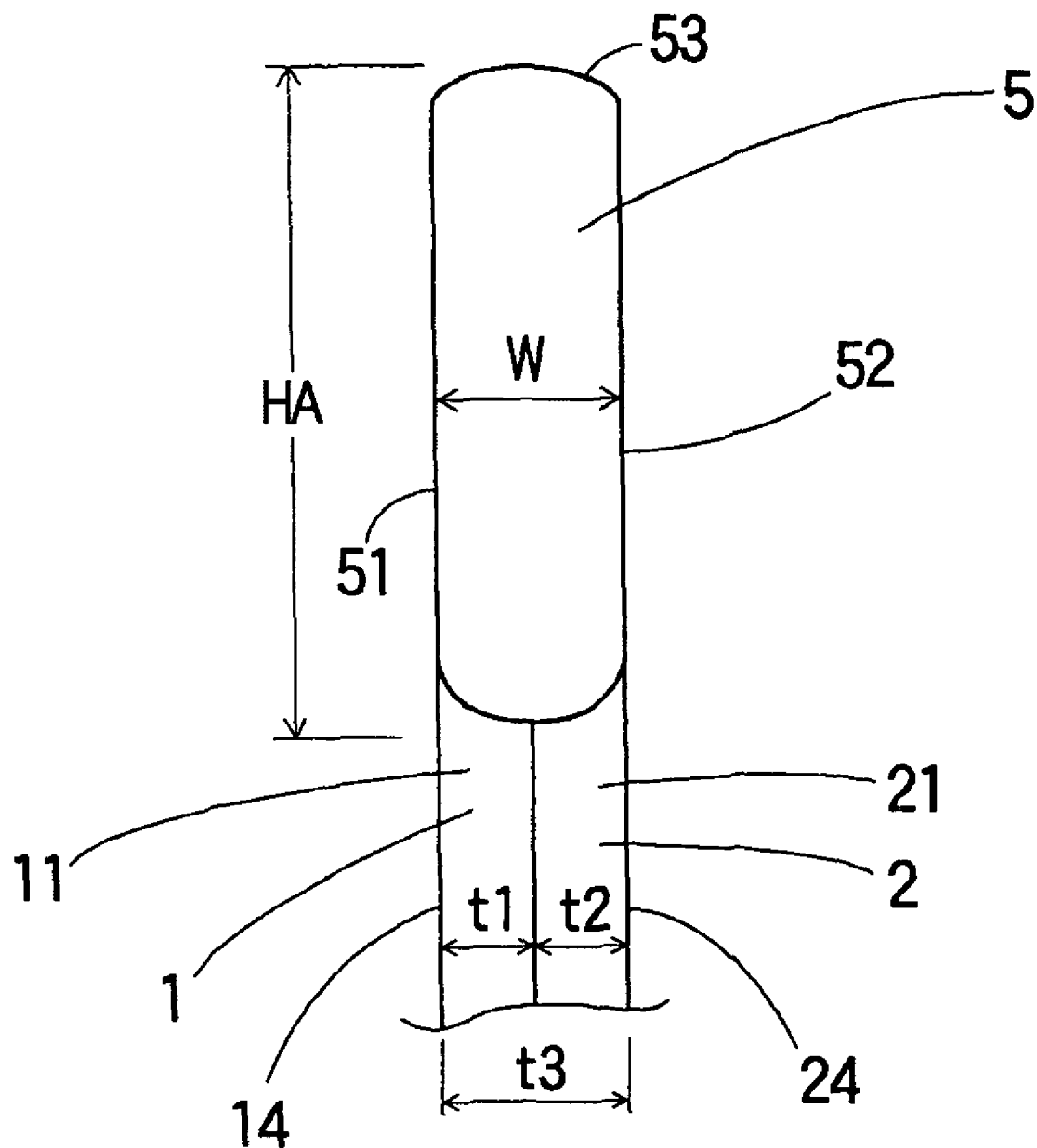
FIG. 6 is a view schematically illustrating the cross-section of a weld bead.

FIG. 6 schematically illustrates a cross-section of the weld bead 5 after fairing. As shown in FIG. 6, the weld bead 5 after fairing is provided with the first exposed surface 51, which is exposed outwards and faces one thickness direction of the first piece of sheet material 1, the second exposed surface 52, which is exposed outwards and faces the opposite thickness direction of the second piece of sheet material 2, and a third exposed surface 53, which crosses both the first exposed surface 51 and the second exposed surface 52. Further, the first and second exposed surfaces 51 and 52 are formed by extending in the direction of weld penetration (laser beam applying direction), so that the exposed surfaces 51 and 52 can be viewed by the naked eyes from the outside.

As schematically shown in FIG. 6, the first exposed surface 51 and the second exposed surface 52 of the faired weld bead 5 face outwards in opposite thickness directions of the weld bead 5. The first exposed surface 51 of the weld bead 5 is faired by the first roller surface 43 of the first rotary unit 41 and is defined to be flat along the first surface 14 of the first edge 11 of the first piece of sheet material 1. The second exposed surface 52 of the weld bead 5 is faired by the second roller surface 44 of the second rotary unit 42 and is defined to be flat along the second surface 24 of the second edge 21 of the second piece of sheet material 2.

As described above, the first exposed surface 51 and the second exposed surface 52 of the weld bead 5 are faired by the first roller surface 43 and the second roller surface 44, respectively, so that the first exposed surface 51 and the second exposed surface 52 can have respective traces formed by the first roller surface 43 and the second roller surface 44. When the traces are concave or convex traces, it is possible to increase the strength of adherence of paint after painting.

According to the first embodiment, as shown in the schematic view of FIG. 6, the first exposed surface 51 of the weld bead 5 is defined along a line extending the first surface 14 of the first edge 11 of the first piece of sheet material 1. Further, the second exposed surface 52 of the weld bead 5 is defined along a line extending the second surface 24 of the second edge 21 of the second piece of sheet material 2.

In other words, when the thickness of the first piece of sheet material 1 is set to t1, and the thickness of the second piece of sheet material 2 is set to t2, the first exposed surface 51 of the weld bead 5 is defined within a range of t1/5 millimeters inside or outside the line extending the first surface 14 of the first edge 11 of the first piece of sheet material 1 in the thickness direction of the weld bead 5. Further, the second exposed surface 52 of the weld bead 5 is defined within a range of t2/5 millimeters inside or outside the line extending the second surface 24 of the second edge 21 of the second piece of sheet material 2 in the thickness direction of the weld bead 5.

In the first embodiment, the depth of weld penetration of the weld bead 5 can be increased by increasing the heat input by the laser beam 7, so that, when the depth of weld penetration of the weld bead 5 is set to HA mm, and the thickness of the first edge 11 of the first piece of sheet material 1 is set to t1 mm, the ratio of HA to t1 (HA/t1) can be determined in the range of 4 to 13, particularly, in the range of 4 to 11 or the range of 4 to 8. Thus, the ratio of the depth of weld penetration of weld bead 5 to the thickness of the first piece of sheet material 1 is determined as a large ratio. The increase in the depth of weld penetration of the weld bead 5 cannot be accomplished through a conventional welding technique.

Further, according to the first embodiment, when the width of the weld bead 5 in the thickness direction of the weld bead 5 is denoted by W (see FIG. 6), the relationship between W and t1 may be expressed as $W \geqq t1$. When $t1+t2=t3$, the width W may be expressed as $W=t3$ or $W \approx t3$. Thus, W/t3 is determined within the range of 0.85 to 1.15, particularly, a range of 0.95 to 1.05.

As described above, the weld bead 5, having the increased depth of weld penetration, can firmly weld the first edge 11 of the first piece of sheet material 1 and the second edge 21 of the second piece of sheet material 2 together. Therefore, it is possible to produce a container 900 (see FIG. 9), which has a chamber 901 defined inside the first piece of sheet material 1 and the second piece of sheet material 2.

As described above, according to the first embodiment, the first rotary unit 41 and the second rotary unit 42, which constitute the fairing device 4, fair the weld bead 5, thus preventing the formation of a humping bead. Thus, even if the heat input by a laser beam is lower or higher than a reference level, a humping bead is prevented from being formed during a welding process.

In the embodiment, the formation of a humping bead can be prevented even when the heat input by the laser beam is higher than a reference level. Thus, the heat input can be increased in order to increase the depth of weld penetration of the weld bead 5 and improve the weld reliability of the weld bead 5. Further, unlike a conventional welding technique, the embodiment of the present invention can provide an increased ratio (HA/t1) of the depth HA of weld penetration of the weld bead 5 to the thickness t1 of the first piece of sheet material 1.

Further, the first exposed surface 51 and the second exposed surface 52 of the faired weld bead 5 are exposed outwards, so that it is possible to observe the depth of weld penetration of the weld bead 5 from the outside with the naked eyes, or using an image pickup device, thus desirably increasing the weld strength and weld reliability of the weld bead 5. Particularly, according to the first embodiment, the thickness of the weld bead 5 is determined as the sum total t3 of the thicknesses t1 and t2 of the first edge 11 of the first piece of sheet material 1 and the second edge 21 of the second piece of sheet material 2. Thus, the weld bead 5 has a desired thickness, increasing the strength of the weld bead 5 and thus increasing the reliability of the weld bead 5, and improving the appearance of the weld bead 5.

According to the first embodiment, although the weld bead 5 is somewhat deformed, both the first roller surface 43 of the first rotary unit 41 and the second roller surface 44 of the second rotary unit 42 of the fairing device 4 can quickly fair the deformed weld bead 5. Thus, when a step is defined between the first end surface 13 (see FIG. 1) of the first edge 11 of the first piece of sheet material 1 and the second end surface 23 of the second edge 21 of the second piece of sheet material 2 before the laser beam 7 is applied to the overlapping edges 11 and 21, a weld bead 5 may be formed in a course to compensate for the effect of the step. In the above state, a good weld bead 5 can be formed. Further, the heat input by the laser beam in the welding method according to the present invention can be increased, as described above, so that, when a step is defined between the overlapping edges, the weld bead 5 can be formed in the course to compensate for the effect of the step. Thus, the present invention greatly increases the freedom of welding conditions.

Further, while welding, the heat input position of the laser beam 7 can be moved the direction of the arrow X1 (welding direction) relative to the first piece of sheet material 1 and the second piece of sheet material 2, thus continuously welding the pieces 1 and 2 together. In the above state, when the fairing device 4 follows the movement of the heat input position of the laser beam 7 relative to the first and second pieces of sheet material 1 and 2 such that the fairing device 4 is moved relative to the first and second pieces of sheet material 1 and 2, the weld bead 5 can be continuously faired. Thus, the productivity of welded products can be increased and the production cost of the welded products can be reduced.

According to the first embodiment, the weld bead 5, which is in a high temperature state, can be quickly cooled both by the first roller surface 43 of the first rotary unit 41 and by the second roller surface 44 of the second rotary unit 42 of the fairing device 4. Thus, the oxidation of the weld bead 5 is restricted, thus improving the anticorrosion property of the weld bead 5. Therefore, it is preferred that both the first roller surface 43 of the first rotary unit 41 and the second roller surface 44 of the second rotary unit 42 be made using a high conductive metal, for example, copper or a copper alloy.

Experimental Example

Figure 7:
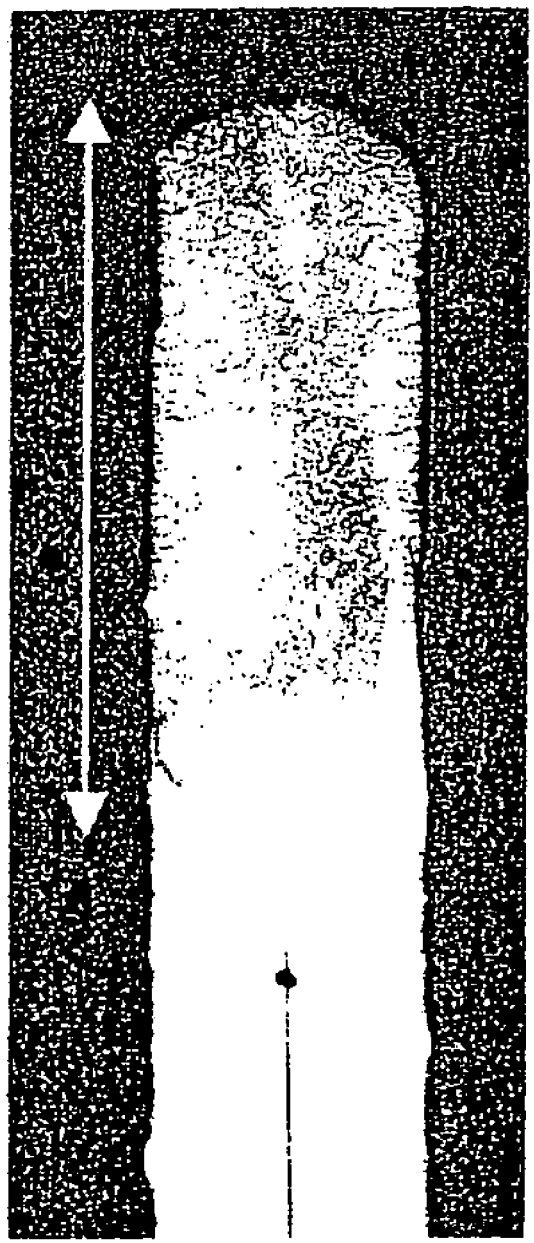
FIG. 7 is a copy of a photograph illustrating the cross-section of a weld bead according to an experimental example of the first embodiment of the present invention.

FIG. 7 is a photograph illustrating the cross-section of a weld bead according to an experimental example of the first embodiment of the present invention. The welding conditions in the experimental example are set as follows: the laser source is a YAG laser, the laser output power is 4.5 kW, the diameter of beam concentration is 0.6 mm, and the material of the first and second pieces of sheet material 1 and 2 is stainless steel. Further, the thickness of the first piece of sheet material 1 is 0.6 mm, the thickness of the second piece of sheet material 2 is 0.6 mm, the welding speed is 3 m/min, and the distance L1 is 8 mm. Further, the material of the first and second rotary units 41 and 42 is a copper alloy, the outer diameter of the first rotary unit 41 is 45 mm, and the outer diameter of the second rotary unit 42 is 45 mm. In the experimental example, the depth HA of weld penetration of the weld bead 5 is 3.8 mm, so that HA/t1=3.8 mm/0.6 mm≈6.3.

According to the experimental example, the ratio (HA/t1) of the depth of weld penetration of the weld bead 5 to the thickness of the first piece of sheet material can be set to a large ratio. Further, when the width of the weld bead 5 in the thickness direction of the weld bead 5 is denoted by W, and the width W is about 1.2 mm, the relationship between the width W and the thickness t1 is expressed as W≧t1 and W≈t1×2.

As shown in the photograph of FIG. 7, the first exposed surface of the weld bead is exposed outwards, and is defined along the line extending the first surface of the first edge of the first piece of sheet material. Further, the second exposed surface of the weld bead is exposed outwards, and is defined along the line extending the second surface of the second edge of the second piece of sheet material.

Second Embodiment

Figure 8:
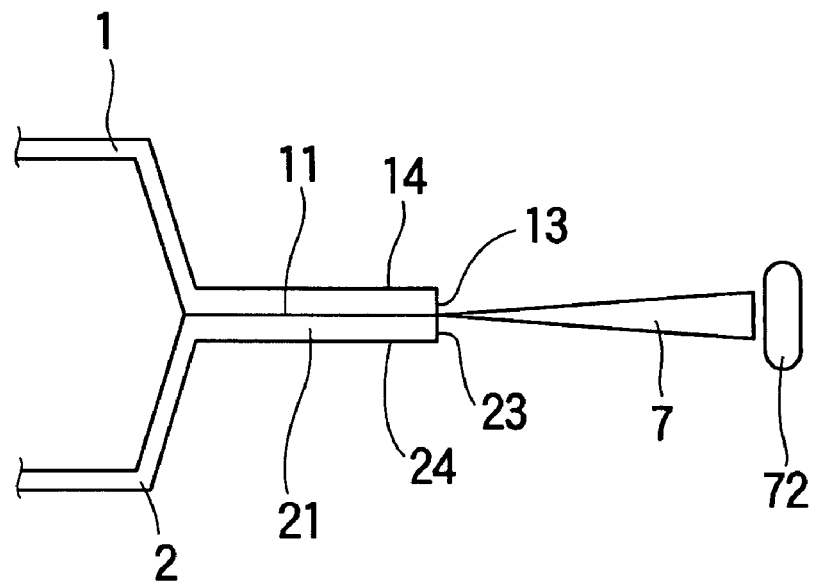
FIG. 8 is a front view schematically illustrating the state in which the first edge of a first piece of sheet material and the second edge of a second piece of sheet material overlap each other and a laser beam is applied to the junction between the overlapping edges, according to a second embodiment of the present invention.
Figure 9:
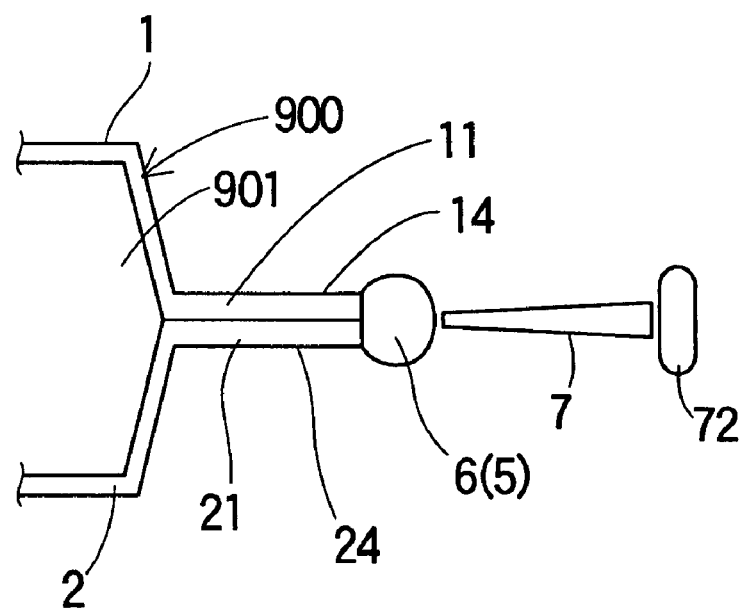
FIG. 9 is a front view schematically illustrating the state in which a laser beam is applied to the junction of the overlapping first and second edges of the pieces of sheet material according to the second embodiment of the present invention, thus forming a molten weld metal or a weld bead on the junction.
Figure 10:
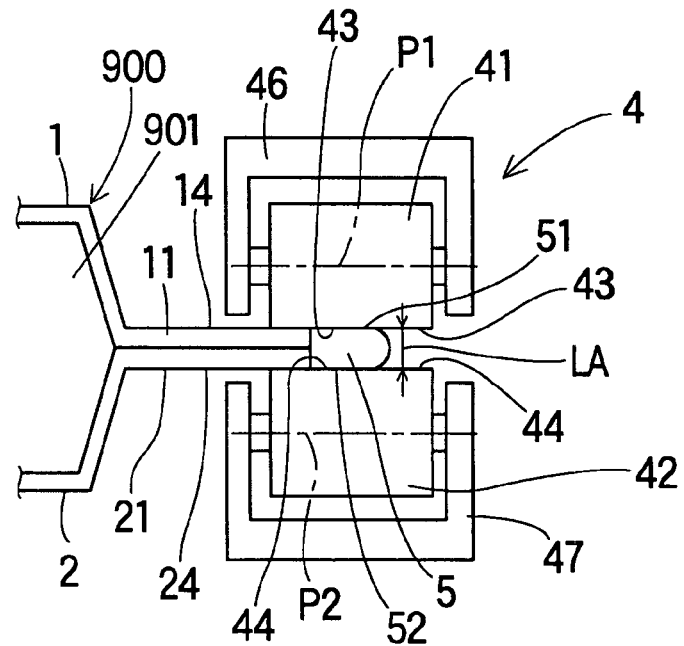
FIG. 10 is a front view schematically illustrating the state in which a weld bead, formed by the laser beam, is faired by a fairing device according to the second embodiment of the present invention.

FIG. 8 through FIG. 10 are views schematically illustrating a second embodiment of the present invention. The basic construction of the second embodiment remains the same as that of the first embodiment, thus providing the same operational effect as that of the first embodiment. Hereinbelow, the second embodiment will be described based on the differences from the first embodiment. As shown in FIG. 10, the fairing device 4 according to the second embodiment comprises a first rotary unit 41, having a first flat roller surface 43 (first contact surface), and a second rotary unit 42, having a second flat roller surface 44 (second contact surface). The first rotary unit 41 is rotatably held in a first support 46, while the second rotary unit 42 is rotatably held in a second support 47. In the second embodiment, both the first rotary unit 41 and the second rotary unit 42 are configured as driven type units, which are not connected to a drive motor, thus being idly rotatable. Further, the first rotary unit 41 and the second rotary unit 42 have the same diameter. The central axis P1 of the first rotary unit 41 is parallel to the central axis P2 of the second rotary unit 42 in a horizontal direction.

To weld pieces of sheet material together according to the second embodiment, as shown in FIG. 8, the first and second pieces of sheet material 1 and 2 are placed horizontally such that the first edge 11 of the first piece of sheet material 1 and the second edge 21 of the second piece of sheet material 2 overlap each other before a laser beam 7 is applied to the overlapping edges 11 and 21. The first and second end surfaces 13 and 23 of the overlapping first and second edges 11 and 21 of the first and second pieces of sheet material 1 and 2 form a level surface. Thus, the laser beam 7 can be evenly applied to the first and second end surfaces 13 and 23, thereby increasing the weld strength of the weld bead 5. However, it should be understood that a step may be defined between the first end surface 13 and the second end surface 23.

As shown in FIG. 8, a YAG laser beam 7, which is a high energy density beam used as the heating device, is applied from a laser source 72 to the end surfaces of the overlapping first and second edges 11 and 21 in a horizontal direction, thus melting the first and second end surfaces 13 and 23. Therefore, a molten weld metal 6 is formed and solidified, thus forming a weld bead 5 as a weld metal zone.

When the laser beam 7 is applied to the horizontally overlapping first and second edges 11 and 21 in the horizontal direction, the weld bead 5 may sag downwards due to gravity, and thus only one rotary unit may be used to support the weld bead 5 upwards in the second embodiment. Described in detail, the second rotary unit 42 is placed under the weld bead 5, while the first rotary unit 41 may be removed from the top of the weld bead 5. In the above state, it is possible to reduce the production cost of welded products and simplify the construction of a welding jig.

As described above, when the weld bead 5 is formed, the fairing device 4 is placed on each side of the weld bead 5 to fair the weld bead 5, as shown in FIG. 10. In the above state, the first roller surface 43 of the first rotary unit 41 comes into contact with the first exposed surface 51 of the weld bead 5, while the second roller surface 44 of the second rotary unit 42 comes into contact with the second exposed surface 52 of the weld bead 5. Because the exposed surfaces 51 and 52 of the weld bead 5 are faired by the fairing device 4, it is possible to provide a weld bead 5 having a good appearance. Thus, even if the heat input by the laser beam is lower or higher than a reference level, the formation of a humping bead can be prevented. Because the formation of the humping bead can be prevented even when the heat input by the laser beam is higher than the reference level, the heat input can be increased to increase the welding speed, increase the depth of weld penetration of the weld bead and thus improve the weld reliability of the weld bead.

In the second embodiment, it is possible to prevent the formation of the humping bead, so that the heat input by a laser beam can be increased to increase the depth of weld penetration and improve the weld reliability of the weld bead 5. Therefore, unlike a conventional welding technique, the second embodiment of the present invention can provide an increased ratio (HA/t1) of the depth HA of weld penetration of the weld bead 5 to the thickness t1 of the first piece of sheet material 1.

Third Embodiment

Figure 11:
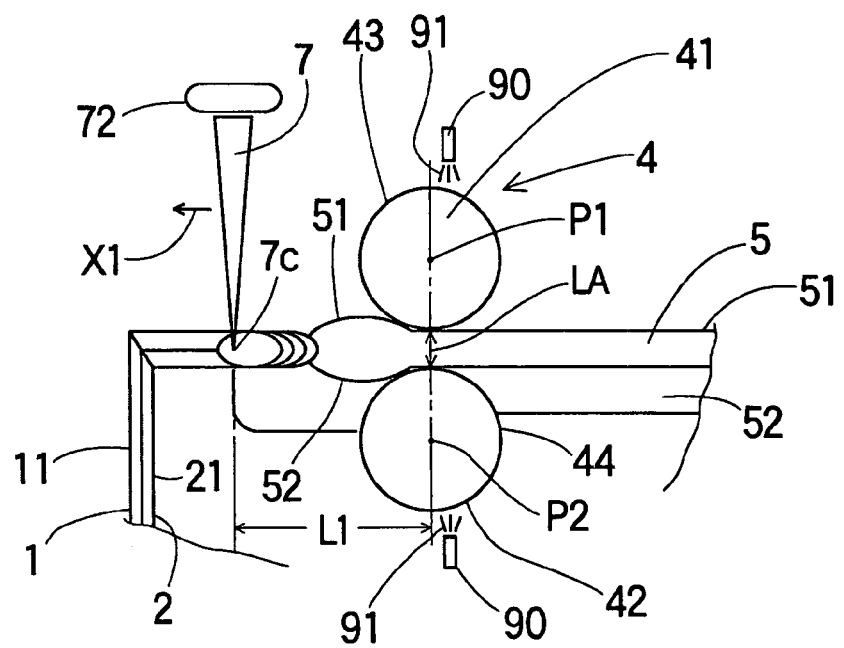
FIG. 11 is a side view schematically illustrating the state in which a weld bead is faired at a position behind the heat input location of a laser beam during application of the laser beam to the junction of overlapping edges of pieces of sheet material according to a third embodiment of the present invention.

FIG. 11 is a view schematically illustrating a third embodiment of the present invention. The basic construction of the third embodiment remains the same as that of the first embodiment, thus providing the same operational effect as that of the first embodiment. Hereinbelow, the third embodiment will be described based on the differences from the first embodiment. In the third embodiment, the fairing device 4 comprises a first rotary unit 41, having a first flat roller surface 43 (first contact surface), and a second rotary unit 42, having a second flat roller surface 44 (second contact surface). Further, a release agent spraying unit 90 is placed to spray a release agent 91 onto both the first roller surface 43 and the second roller surface 44. In the third embodiment, the release agent 91 allows easy removal of the first rotary unit 41 and the second rotary unit 42 from the weld bead 5. Further, the release agent 91 effectively prevents the first rotary unit 41 and the second rotary unit 42 from overheating.

Fourth Embodiment

Figure 12:
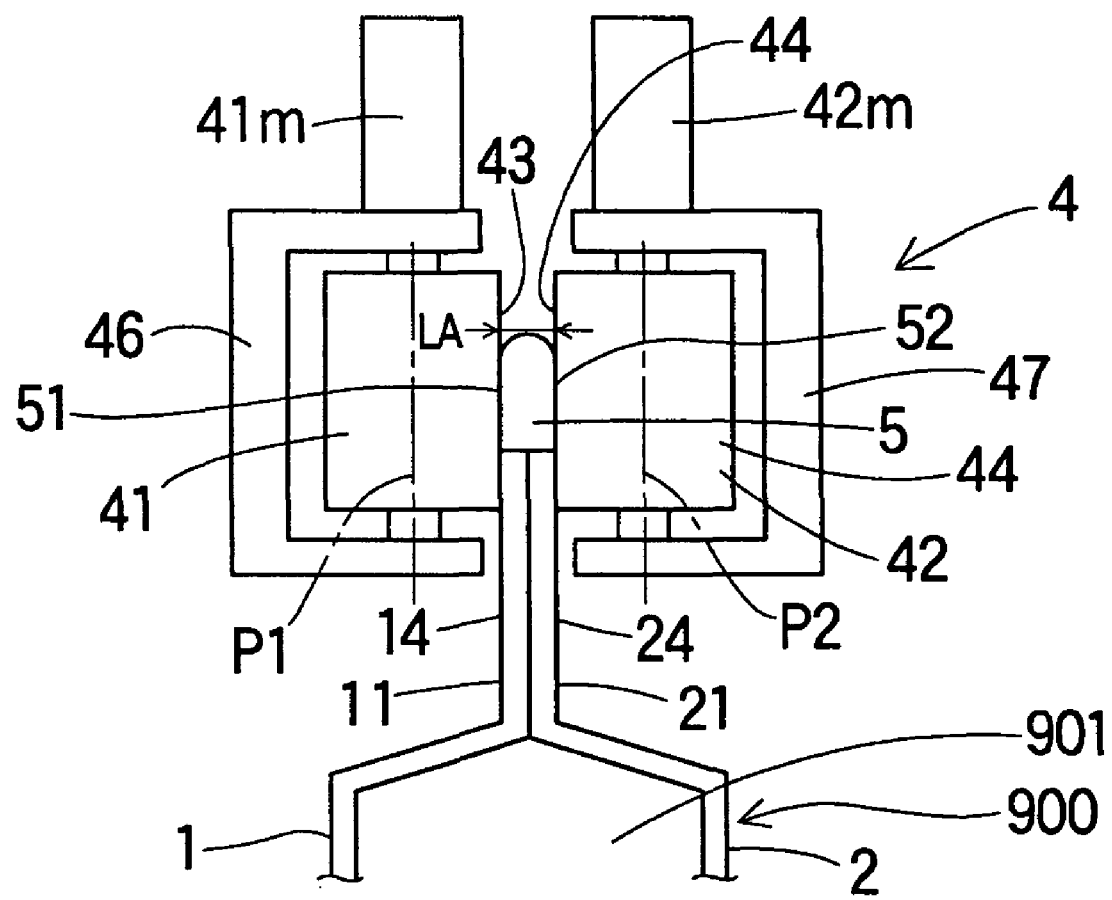
FIG. 12 is a front view schematically illustrating the state in which a weld bead, formed by a laser beam, is faired by a fairing device according to a fourth embodiment of the present invention.

FIG. 12 is a view schematically illustrating a fourth embodiment of the present invention. The basic construction of the fourth embodiment remains the same as that of the first embodiment, thus providing the same operational effect as that of the first embodiment. Hereinbelow, the fourth embodiment will be described based on the differences from the first embodiment. In the fourth embodiment, the fairing device 4 comprises a first rotary unit 41, having a first flat roller surface 43, and a second rotary unit 42, having a second flat roller surface 44. The first rotary unit 41 is rotated by a first drive motor 41m, which is a drive unit supported by a first support 46. In the same manner, the second rotary unit 42 is rotated by a second drive motor 42m, which is a drive unit supported by a second support 47. Further, there may be a difference in rpm between the first rotary unit 41 and the second rotary unit 42. Thus, the fourth embodiment can easily respond to differences in the length of a weld line between the first exposed surface 51 and the second exposed surface 52 of the weld bead 5. Further, in the fourth embodiment, the first rotary unit 41 and the second rotary unit 42 may sometimes be rotated synchronously.

Fifth Embodiment

Figure 13:
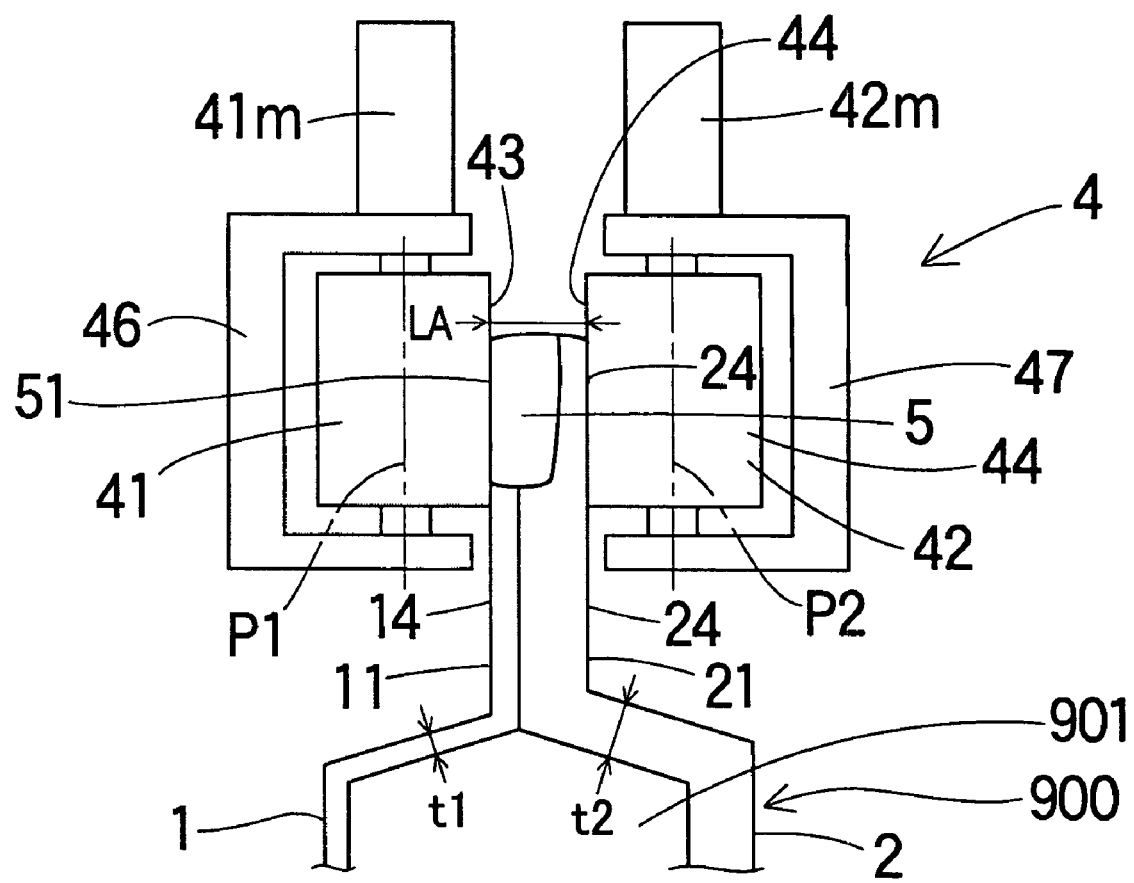
FIG. 13 is a front view schematically illustrating the state in which a weld bead, formed by a laser beam, is faired by a fairing device according to a fifth embodiment of the present invention.

FIG. 13 is a view schematically illustrating a fifth embodiment of the present invention. The basic construction of the fifth embodiment remains the same as that of the first embodiment, thus providing the same operational effect as that of the first embodiment. Hereinbelow, the fifth embodiment will be described based on the differences from the first embodiment. In the fifth embodiment, the thickness t2 of the second piece of sheet material 2 is greater than the thickness t1 of the first piece of sheet material 1. The weld bead 5 is extended and formed in the direction of the depth of weld penetration of the weld bead 5. The weld bead 5 has an exposed surface 51, which is exposed outwards from the first piece of sheet material 1. In the above state, the surface 24 (non-welded surface) of the second piece of sheet material 2 is exposed at the side opposite the exposed surface 51 of the weld bead 5. As shown in FIG. 13, the first rotary unit 41 comes into contact with the first exposed surface 51 of the weld bead 5, while the second rotary unit 42 comes into contact with the surface 24 of the second piece of sheet material 2. In the above state, the weld bead 5 is interposed between the first rotary unit 41 and the second rotary unit 42, so that the first exposed surface 51 of the weld bead 5 can be properly faired by the fairing device 4.

Sixth Embodiment

Figure 14:
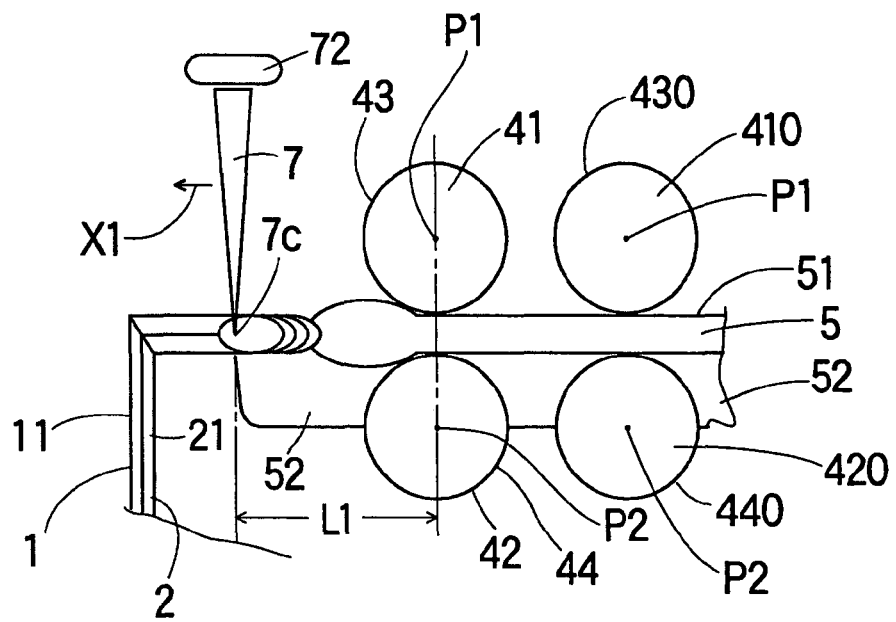
FIG. 14 is a side view schematically illustrating the state in which a weld bead is faired at a position behind the heat input location of a laser beam during application of the laser beam to the junction of overlapping edges of pieces of sheet material according to a sixth embodiment of the present invention.

FIG. 14 is a view schematically illustrating a sixth embodiment of the present invention. The basic construction of the sixth embodiment remains the same as that of the first embodiment, thus providing the same operational effect as that of the first embodiment. Hereinbelow, the sixth embodiment will be described based on the differences from the first embodiment. In the sixth embodiment, the fairing device 4 comprises a first rotary unit 41, which has a first flat roller surface 43 and is used for primary fairing of a weld bead 5, and a second rotary unit 42, which has a second flat roller surface 44 and is used for primary fairing of the weld bead 5. The fairing device 4 further comprises a first rotary unit 410, which has a first flat roller surface 430 and is used for final fairing of the weld bead 5, and a second rotary unit 420, which has a second flat roller surface 440 and is used for final fairing of the weld bead 5. In the sixth embodiment, the final fairing is executed after the primary fairing, so that the weld bead 5 can be effectively faired to realize a good appearance.

Seventh Embodiment

Figure 15:
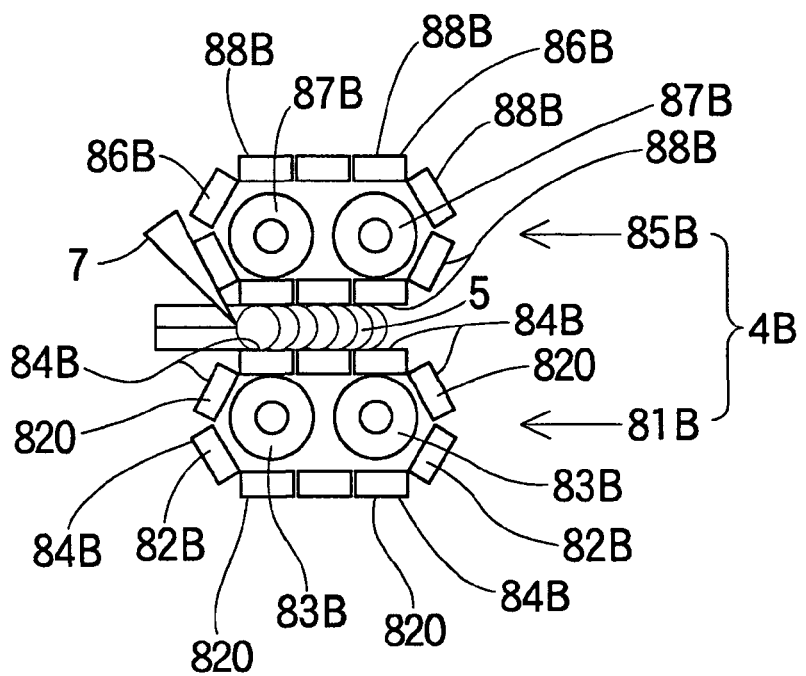
FIG. 15 is a side view schematically illustrating the state in which a weld bead is faired at a position behind the heat input location of a laser beam during application of the laser beam to the junction of overlapping edges of pieces of sheet material according to a seventh embodiment of the present invention.
Figure 16:
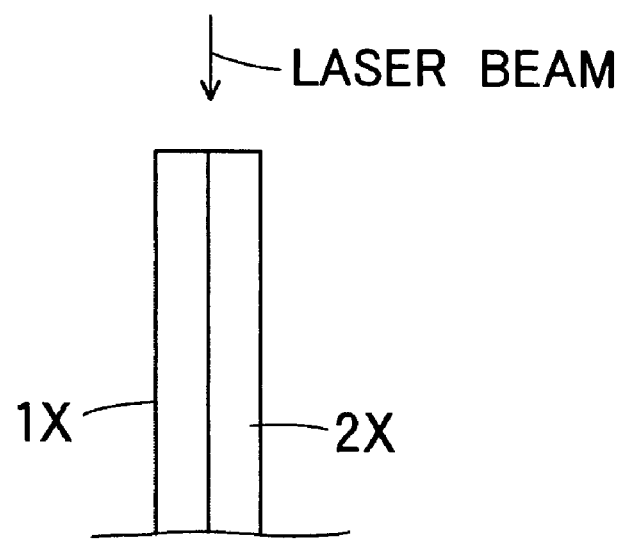
FIG. 16 is a front view schematically illustrating the state in which the first edge of a first piece of sheet material and the second edge of a second piece of sheet material overlap each other and a laser beam is applied to the junction between the overlapping edges, according to the related art.
Figure 17:
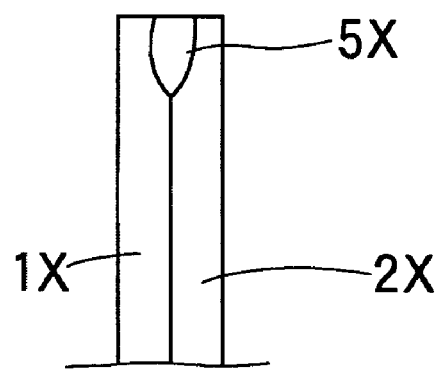
FIG. 17 is a front view schematically illustrating the state in which a laser beam is applied to the junction of the overlapping first and second edges of the pieces of sheet material according to the related art, thus forming a weld bead on the junction.
Figure 18:
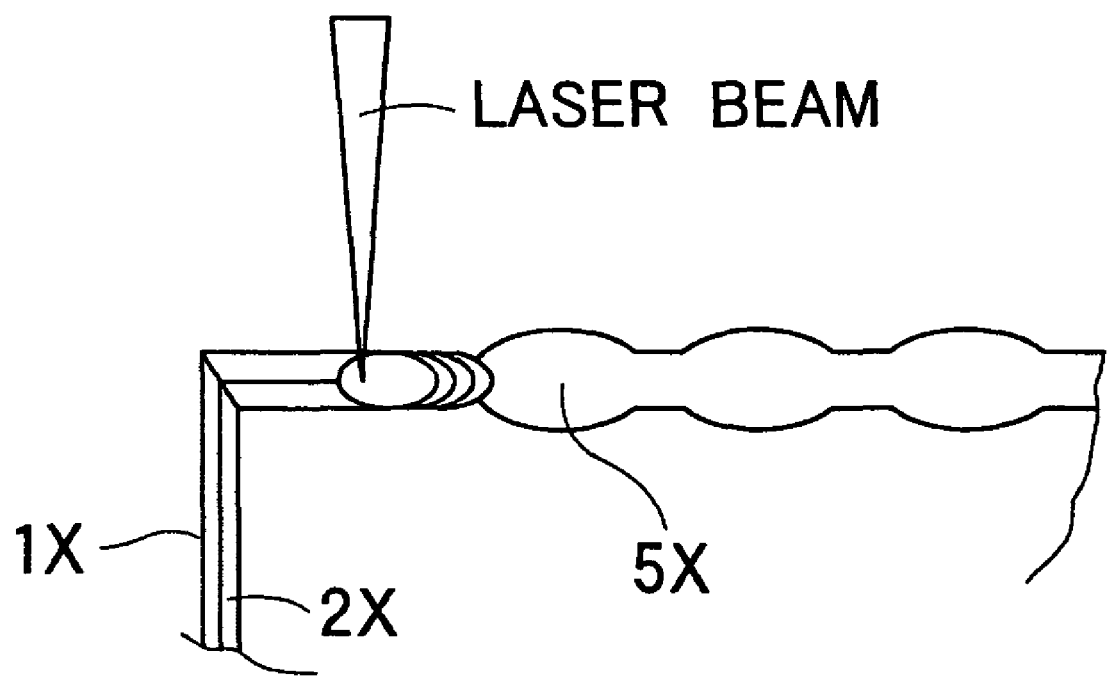
FIG. 18 is a side view schematically illustrating the state in which the weld bead, formed by the laser beam, becomes a humping bead according to the related art.

FIG. 15 is a view schematically illustrating a seventh embodiment of the present invention. The basic construction of the seventh embodiment remains the same as that of the first embodiment, thus providing the same operational effect as that of the first embodiment. Hereinbelow, the seventh embodiment will be described based on the differences from the first embodiment. As shown in FIG. 15, the fairing device 4B comprises a first endless unit 81B and a second endless unit 85B, which are placed such that the thickness of the weld bead 5 is interposed between the two endless units 81B and 85B.

The first endless unit 81B comprises a first endless assembly 82B and a first rotary unit 83B, which acts as a first support for supporting the first endless assembly 82B. In the same manner, the second endless unit 85B comprises a second endless assembly 86B and a second rotary unit 87B, which acts as a second support for supporting the second endless assembly 86B.

As shown in FIG. 15, the first endless assembly 82B comprises a plurality of segments 820, which are arranged in an endless arrangement and are coupled to each other, thus forming a caterpillar structure in which the segments 820 are movable with respect to each other. The first endless assembly 82B comprises first contact surfaces 84B, which come into contact with the weld bead 5. In response to the rotation of the first rotary unit 83B, the first endless assembly 82B is rotated while the first contact surfaces 84B are in contact with the weld bead 5. The second endless unit 85B has the same construction as that of the first endless unit 81B, and is operated in the same manner as the first endless unit 81B.

In the seventh embodiment, when a weld bead 5 is formed by the laser beam 7, the fairing device 4B fairs the weld bead 5, as shown in FIG. 15. In other words, the first contact surfaces 84B of the first endless assembly 82B come into contact with the first side surface of the weld bead 5 in the thickness direction of the weld bead 5. In the same manner, the second contact surfaces 88B of the second endless assembly 86B come into contact with the second side surface of the weld bead 5 in the thickness direction of the weld bead 5.

Because the weld bead 5 can be faired by the fairing device 4B, as described above, the seventh embodiment provides a weld bead 5 having a good appearance. Thus, even if the heat input is lower or higher than a reference level, the formation of a humping bead can be prevented. Because the formation of the humping bead can be prevented even when high heat is input, it is possible to increase the depth of weld penetration, increase the strength of the weld bead 5 and, at the same time, improve the weld reliability of the weld bead 5 by increasing the heat input.

Other Embodiments

In the first embodiment, the rotary units 41 and 42, which constitute the fairing device, compress the entire length of the weld bead 5 in the bead height direction. However, part of the overall length of the weld bead 5 in the bead height direction (for example, at least 40% or at least 50% of the overall length of the weld bead 5 in the bead height direction) may be compressed by the rotary units 41 and 42, without affecting the functioning of the present invention. While the invention has been shown and described with respect to the preferred embodiments, it will be understood by those skilled in the art that various changes and modifications may be made without departing from the spirit and scope of the invention as defined in the following claims.

Industrial Applicability

As apparent from the above description, the present invention is preferably used in the production of welded products or in welding methods. Particularly, the present invention is preferably used in producing welded products using a heating device, for example, high energy density beams, such as laser beams, or in welding methods.

The invention claimed is:

1. A welding method, comprising:
butting a first object piece, having a first outermost end, and a second object piece, having a second outermost end, together;
heating the butted first and second object pieces at the first outermost end and the second outermost end using a heating device, thus forming a weld metal zone from the first outermost end and the second outermost end; and
fairing the weld metal zone in such a manner that when the weld metal zone is formed by melting and solidifying the first object piece outermost end and the second object piece outermost end, a contact surface of a fairing device comes into contact with and compresses an exposed surface which is formed on the weld metal zone, wherein the exposed surface of the weld metal zone is melted and exposed outwards.

2. The welding method according to claim 1, wherein the heating device is selected from the group consisting of high energy density beams, electric arcs, electric currents and gases.

3. The welding method according to claim 1 or claim 2, wherein each of the first and second object pieces comprises a sheet material.

4. The welding method according to claim 1, wherein the fairing device is placed behind a part of the butted first and second object pieces, heated by the heating device, in a welding direction.

5. The welding method according to claim 1,
wherein the fairing device comprises a first compression unit and a second compression unit; and
wherein at least one of the first and second compression units comprises a rotary unit having a contact surface that comes into contact with the weld metal zone.

6. The welding method according to claim 5, wherein the fairing device comprises:
an endless assembly having a contact surface that comes into contact with the weld metal zone, the endless assembly for being rotated with the rotary unit while the contact surface of the endless assembly comes into contact with the weld metal zone; and
a support for supporting the endless assembly.

7. The welding method according to claim 1, wherein a distance between the part of the butted first and second object pieces that is heated by the heating device and the fairing device varies.

8. The welding method according to claim 1, wherein the weld metal zone comprises two exposed surfaces facing opposite directions and exposed outwards.

9. The welding method according to claim 1, wherein the first object piece comprises a first piece of sheet material, and the second object piece comprises a second piece of sheet material, wherein an edge of the first piece of sheet material and an edge of the second piece of sheet material overlap each other.

10. The welding method according to claim 9, wherein a depth of weld penetration of the weld metal zone is set to HA millimeters and a thickness of the first piece of sheet material is set to t1 millimeters, $HA/t1=2$ to $20$, so that a ratio of the depth of weld penetration of the weld metal zone to the thickness of the first piece of sheet material is large.

11. The welding method according to claim 9, wherein the weld metal zone comprises:
a first exposed surface exposed outwards and facing one thickness direction of the first piece of sheet materials; and
a second exposed surface exposed outwards and facing an opposite thickness direction of the second piece of sheet material.

12. The welding method according to claim 9, wherein the weld metal zone comprises an exposed surface exposed outwards and facing outwards from one of the first piece of sheet material and the second piece of sheet material, wherein a remaining one of the first piece of sheet material and the second piece of sheet material is exposed at a side opposite the exposed surface of the weld metal zone.

13. The welding method according to claim 12, wherein, when the thickness of the first piece of sheet material is set to t1, the first exposed surface of the weld metal zone is defined within a range of t1/5 millimeters inside or outside a line extending a surface of the first piece of sheet material in the thickness direction of the weld metal zone, and the second exposed surface of the weld metal zone is defined within a range of t1/5 millimeters inside or outside a line extending a surface of the second piece of sheet material in the thickness direction of the weld metal zone.

14. The welding method according to claim 12, wherein the first exposed surface of the weld metal zone is defined along the line extending the surface of the first piece of sheet material, and the second exposed surface of the weld metal zone is defined along the line extending the surface of the second piece of sheet material.

15. A weld fairing apparatus for fairing a weld metal zone, comprising:
- a heating device configured to heat a first outermost end of a first object piece and a second outermost end of a second object piece butted with the first object piece, to form a weld metal zone by melting and solidifying the first outermost end and the second outermost end;
- a fairing device comprising a contact surface for coming into contact with and compressing an exposed surface, which is formed on the weld metal zone, wherein the contact surface contacts with a surface of the butted first and second object pieces, and wherein the exposed surface is melted and exposed outwards.

16. The weld fairing apparatus according to claim 15,
- wherein the fairing device comprises a first compression unit and a second compression unit; and
- wherein a distance between the first compression unit and the second compression unit in a thickness direction of the weld metal zone varies.

17. The weld fairing apparatus according to claim 16, wherein at least one of the first and second compression units comprises a rotary unit having the contact surface that comes into contact with and compresses the weld metal zone.

18. The weld fairing apparatus according to claim 17, wherein the fairing device comprises:
- an endless assembly having the contact surface that comes into contact with the weld metal zone, the endless assembly for being rotated with the rotary unit while the contact surface of the endless assembly comes into contact with the exposed surface of the weld metal zone; and
- a support for supporting the endless assembly.

19. The weld fairing apparatus according to claim 15, wherein a distance between the part heated by the heating device and the fairing device varies.

20. The welding method of claim 1, wherein the heating device comprises a laser.

21. The weld fairing apparatus according to claim 15, wherein the heating device comprises a laser.

* * * * *